United States Patent [19]

Inokawa et al.

[11] Patent Number: 5,173,117
[45] Date of Patent: Dec. 22, 1992

[54] ADDITIVES FOR ROLLER COMPACTED CONCRETE PAVEMENT

[75] Inventors: Hisashi Inokawa, Matsudo; Kiyohiko Uchida, Narashino; Kazuo Inada, Funabashi; Noriyuki Kozakai, Matsudo, all of Japan

[73] Assignee: Sumitomo Cement Co. Ltd., Tokyo, Japan

[21] Appl. No.: 795,761

[22] Filed: Nov. 21, 1991

Related U.S. Application Data

[63] Continuation of Ser. No. 593,010, Oct. 5, 1990, abandoned.

[30] Foreign Application Priority Data

Oct. 27, 1989 [JP] Japan .................................. 1-278365

[51] Int. Cl.⁵ ............................................ C04B 24/04

[52] U.S. Cl. .................................... 106/823; 106/724; 106/734; 106/728; 106/804; 106/809; 106/810

[58] Field of Search ............... 106/728, 734, 810, 724, 106/823, 804, 809

[56] References Cited

U.S. PATENT DOCUMENTS 1,840,710  1/1932  Goddard ............................ 106/728
4,391,645  7/1983  Marcellis et al. .................... 106/809

*Primary Examiner*—Shrive Beck
*Assistant Examiner*—C. Melissa Bonner
*Attorney, Agent, or Firm*—Hoffman, Wasson & Gitler

[57] ABSTRACT

An additive for roller compacted concrete pavement which controls the heat of hydration, prevents the reduction of packing of the pavement and prevents thermal cracking of the dried end product. The additive is a hydrolyzable tannin compound used alone or in conjunction with a surface active agent.

4 Claims, 1 Drawing Sheet gallotannin(I)

corilagin(II)

chebulagic acid(III)

chebulinic acid(IV)

gallotannin(I)

corilagin(II)

chebulagic acid(III)         chebulinic acid(IV)

ADDITIVES FOR ROLLER COMPACTED CONCRETE PAVEMENT

This is a continuation of copending application Ser. No. 07/593,010 filed on Oct. 5, 1990, now abandoned.

BACKGROUND OF THE INVENTION

1. Field of the Invention

The present invention relates to an additive for roller compacted concrete pavement. Particularly, it relates to additives for improving the pavement properties of roller compacted concrete and mortar.

2. Description of the Prior Art

A roller compacted pavement which has been recently spread can ideally use concrete with zero slump. This is significantly different in state from a common concrete. The roller compacted pavement, in order to accomplish zero slump, must drastically reduce the content of water contained in its concrete, and as a result the rate of packing of the concrete is decreased during the period from the initial mixing of the starting material to the application of the concrete. Evaporation of water due to heat of hydration and sun irradiation, reduces the strength of the resulting concrete and the resulting cured concrete often cracks. This problem often occurs in summer laying of roller compacted pavement.

Further, the thickness of the layer produced by a roller compacted pavement can not be more than 30 cm, because of the difficulty of packing of the concrete. When heavy pavement having more than 30 cm in thickness is required because of heavy traffic situations, double layering must be used. In this situation, there is an inherent weakness in the adhere strength between the layers.

In the conventional process of relaying a roller compacted pavement, it is difficult to control the content of water concrete in the pavement, and/or the packing of the concrete for laying the roller compacted concrete pavement.

SUMMARY OF THE INVENTION

It is an object of the present invention to provide an additive composition for use in roller compacted pavement, which can control heat of hydration and can prevent the reduction of the packing of the concrete during the period from the initial mixing to the laying operation, particularly in roller compacted pavement in summer.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF PREFERRED EMBODIMENTS

The inventors have detailedly studied cracks which occur in laying roller compacted concrete pavement in summer. They have uncovered that hydration of the cement used is accelerated by the influence of ambient high temperature so as to heat the concrete mixture, and as a result, cracks occur in the cured concrete. The temperature of the concrete has been measured during laying or forming of roller compacted concrete pavement, and it has been found that the temperature rise from the ambient temperature is about 20° C. in maximum, and after several days, cracks of 2 mm in width were found in the cured concrete (so called "thermal cracks of concrete").

The present invention is made on the basis of such findings. A conventional retarder for the hydration of cement and a reducer of water content of the concrete have been used in concrete for use in roller compacted concrete pavement. When the laying or forming of the roller compacted concrete pavement is carried out at the ambient temperature of about 30° C., and an excess amount of the above-mentioned additives are added so as to increase retardation of the hydration of the cement, the temperature of concrete rises the same as normal "roller compacted concrete", and rapid hydration would be generated, because the exothermic reaction cannot be controlled. (See pages 86 to 89, Cement Gijutu-Nenpou (Annual report) Vol. 41). Essentially, conventional additives do not operate under such conditions.

The inventors have investigated various kinds of additives to prevent thermal (temperature) cracks in the cure concrete, and have discovered that when a hydrolyzable tannin compound is added to the concrete mixture for use in roller compacted concrete pavement, good performance of the concrete can be obtained.

Figure 1:
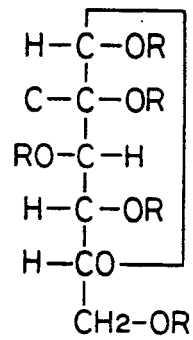
FIG. 1 shows chemical structures of typical examples of hydrolyzable tannin compounds used as an active additive for roller compacted pavement in accordance with the present invention.
Figure 1:
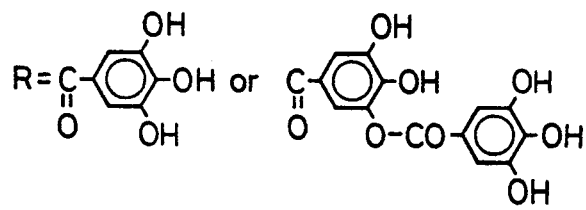
Figure 1:
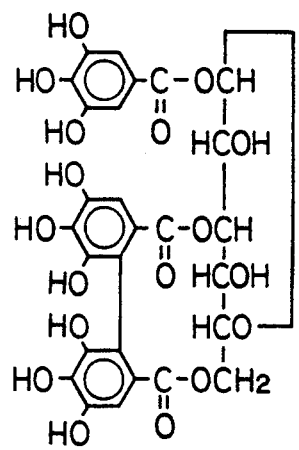
Figure 1:
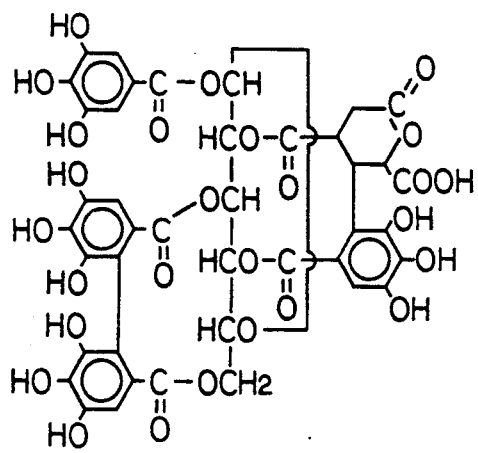
Figure 1:
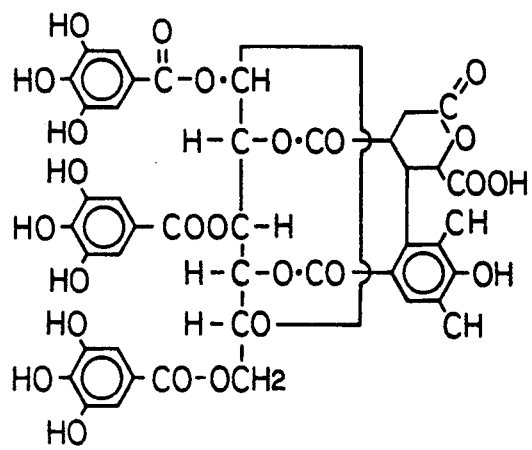

A hydrolyzable tannin compound used as an active component in forming roller compacted concrete pavement, in accordance with the present invention is a compound which is produced by ester linkage of phenolic carboxylate and saccharide, and the structures of typical compounds are shown in FIG. 1.

A hydrolyzable tannin compound used as an active additive in the formation or laying of roller compacted concrete pavement, in accordance with the present invention may include the following compounds of the chemical structures as shown in FIG. 1.

Gallotannin,
Corilagin,
Chebulagic acid,
Chebulinic acid.

Further, m-gallotannic acid or digallic acid known as a tannic acid can be used.

It is known that these compounds can be easily decomposed in presence of an acid or an alkali agent. These compounds can form gallic acid or ellagic acid and saccharide by the hydrolysis. These hydrolyzates significantly control the hydration rate of the cement, and at that time, the heat of hydration of the cement can be controlled.

Such additives, selected by the present invention, can be used together with other mixing agents, or other additive agents to reduce hydration heat, e.g., a known water reducer such as a lignin compound, formaline condensate of naphthalene-sulfonate, and a known retarder such as lignin compound, oxycarboxylic acid compound, silicon fluoride.

Further, a known wetting agent can be used, such as a non-ionic surface active agent e.g., polyoxyethylene alkyl allyl ether, an anionic surface active agent e.g., alkyl sulfate, dialkyl sulfosuccinate, and a known antifoaming non-ionic surface active agent, e.g., propylene glycol-ethylene glycol block copolymer.

The kinds of cements to be used for formation or laying of the roller compacted concrete pavement in accordance with the present invention may include common cement, portland cement type I, portland with high early strength cement (type III), portland with moderate sulfate resistance cement (type II), portland with moderate heat or hydration cement (type III), and portland with low heat of hydration cement (type IV) (U.S.A.) (note that the terminology of the kinds of cement is dependent on the industrial state and level of each country, and varies respectively with each of the countries, and the cement to be used may include the kinds of cements which can be used for laying the pavement); and normal portland cement (10), high early-strength portland cement (30), portland blast-furnace slag cement (10S), moderate portland cement (20), sulphate resistant portland cement (50), moderate portland cement (20) and low heat of hydration cement (40) (Canada); ordinary portland cement (A), high early strength portland cement (B), ordinary portland blast-furnace cement (SA), high early strength portland blast-furnace cement (SB), sulphate-resisting portland cement (D), low heat portland cement (C), low heat portland cement (C), low heat portland fly-ash cement (FC) and low heat portland blast-furnace cement (SC) (Australia); portland artificial ciment (CPA), portland compose ciment (CPJ), de haut fourneau ciment (CHF), laitier au clinker (CLK) and sursulfate ciment (CSS) (France), Portlandzement (PZ), Eisenportlandzement (EPZ), Trasszement (TrZ), Hochofenzement (HOZ), Portlandzement mit Hohem Suflatwiderstand (HS(PZ)), Hochogenzement mit hohem Sulfatwiderstand (HS(BLF)), and Mit Niedriger Hydration Swarme (NW) (FRG); portland (P), porland de alta resistencia inicial (P-ARI), portland con adiciones actavas (PA), cementos compuestos (C), siderurgico I~III (S- I~III), puzolanico I~II (PUZ I~PUZ II), portland blanco (P-B), cementos compuestos blancos (C-B), portland rseistente al yeso (P-Y), portland de bajo calor de hidratacion (P-BC) and aluminoso (A) (Spain); and alumina cement containing aluminate as major component, super-rapid curing cement containing $C_{11}A_7 \cdot CaF_2$, and special cement using calcium sulfoaluminate ($C_4A_3S$).

The additive composition used in accordance with the present invention can be used in the concrete in an amount of from 0.05 percent by weight to 3 percent by weight based on the weight of the cement. The amount of the inventive additive may be changed depending on the kind of the cement. The preferable amount of the inventive additive to common portland cement for use in roller compacted concrete pavement is from 0.1 percent to 1.0 percent by weight based on the weight of the cement.

The additive composition used in accordance with the present invention can be preparatorily mixed or added with the cement as a powder. Alternatively, it can be dissolved in water to be used for the preparation of the concrete because of its water solubility.

The additive composition used in accordance with the present invention can be effective in retarding the hydration or reaction of the cement in forming the roller compacted concrete pavement, so as to avoid thermal cracks of the cured concrete, because the additive can restrain the exothermal reaction of hydration.

The present invention is further illustrated by the following examples to show an additive for use in roller compacted concrete pavement, but should not be interpreted for the limitation of the invention.

EXAMPLES

A normal portland cement 297 kg/m³ was used to prepare a concrete for a roller compacted concrete pavement, with the ratio of water to cement being 36.4 weight percent, and the ratio of s/a (sand to aggregate ratio: the volumic ratio of sand to coarse aggregate) being 41.5 percent, and 108 kg/m³ of water, 875 kg/m³ of sand, and 1,223 kg/m³ of coarse aggregate (gravels) were mixed with, so as to produce $K_p$ (the ratio of the cement paste volume used in 1 M³ of the resulting concrete) being 1.10, $K_m$ (the ratio of the cement paste volume used in m3 of the resulting concrete to the pore volume of the coarse aggregate used in 1 m³ of the concrete) being 1.75. Then the additive(s) as shown in Table 1 for each example were added and each of the concrete formulations were mixed. The resulting concrete was layed at the temperature of 20° C. so as to produce the roller compacted concrete. Each of the resulting layed concrete samples were measured to determine a rate of packing (VC valve) by a vibrational consistency testing method (VC test), and then the time dependence of the rate of packing (VC valve) and the strength for each of the samples is shown in Table 2.

This VC valve will indicate the index for the packing of the concrete, and the less change would be preferable.

TABLE 1

| Kinds of used additives for use in roller compact pavement |  |
|---|---|
| | ADDITIVES |
| Example 1: | tannic acid 0.25% |
| Example 2: | tannic acid 0.25% + lignin derivative AE retarder 0.2% |
| Example 3: | tannic acid 0.25% + oxycarboxylate derivative retarder 0.2% |
| Example 4: | tannic acid 0.25% + polyoxyethylene alkyl allyl ether derivative retarder 0.01% |
| Reference Example 1: | no additive |
| Reference Example 2: | lignin derivative AE retarder 0.25% |

TABLE 2

| | Time dependence of VC Valve and Strength of the concrete | | | | |
|---|---|---|---|---|---|
| | VC valve (%) | | Strength (formed after 60 min.) (kg/cm²) | | |
| | initial | after 60 min. | 1 day | 7 days | 28 days |
| Ex. 1: | 97.0% | 94.5% | 126 kgf/cm² | 300 kgf/cm² | 380 kgf/cm² |
| Ex. 2: | 97.5% | 95.0% | 120 kgf/cm² | 310 kgf/cm² | 395 kgf/cm² |
| Ex. 3: | 97.0% | 96.0% | 128 kgf/cm² | 320 kgf/cm² | 404 kgf/cm² |
| Ex. 4: | 99.0% | 97.0% | 120 kgf/cm² | 350 kgf/cm² | 420 kgf/cm² |
| Ref. 1: | 96.0% | 87.0% | 130 kgf/cm² | 270 kgf/cm² | 330 kgf/cm² |
| Ref. 2: | 97.0% | 90.0% | 130 kgf/cm² | 280 kgf/cm² | 350 kgf/cm² |

It is apparent from the result shown in Tables 1 and 2 that the additives for use in roller compacted concrete evidence less change in the VC valve of the concrete through time passage and have relatively high strength in the resulting cured concrete over time after 7 and more days, as compared with the reference conventional pavement concrete.

The addition of the specific additive in accordance with the present invention to the concrete composition in use for formation of the roller compacted concrete will improve the operation performance of the used concrete, in which the packing of the concrete will undergo less change, and the concrete composition will have improved strength, because the specific additive can control the hydration heat during curing the concrete, so as to minimize thermal cracking in the cured concrete pavement. As a result, the cured concrete pavement is improved. Notably, the specific additive in accordance with the present invention provides significant improved results in summer placing of roller compacted concrete pavement.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An additive composition for use in roller compacted concrete pavement comprising:
    a hydrolyzable tannin compound as an active ingredient; and a surface active agent selected from the group consisting of polyoxyethylene alkyl allyl ether, alkyl sulfate, dialkyl sulfosuccinate or propylene glycolethylene glycol block copolymer wherein said composition contains 1 to 99 percent by weight of said hydrolyzable tannin compound and 1 to 99 percent by weight of said surface active agent.

2. An additive composition in accordance with claim 1 further comprising an additive agent selected from the group consisting of a lignin compound, formaline, condensate of napthalene-sulfonate, an oxycarboyxlic acid compound, silicon fluoride, and mixtures thereof.

3. An additive composition in accordance with claim 1, wherein said hydrolyzable tannin compound is gallotannin, corilagin, chebulagic acid or chebulinic acid.

4. A roller compacted cement pavement composition comprising: cement; sand; coarse aggregate; and an additive composition in accordance with claim 1.

* * * * *